United States Patent [19]

von Meer et al.

[11] 4,352,861
[45] Oct. 5, 1982

[54] PHOTOGRAPHIC PAPER BASE WITH IMPROVED DURABILITY

[75] Inventors: Walter von Meer, Bad Iburg; Uwe Jensen, Osnabruck; Reiner Anthonsen, Bramsche, all of Fed. Rep. of Germany

[73] Assignee: Felix Schoeller, Jr. GmbH & Co. KG, Osnabruck, Fed. Rep. of Germany

[21] Appl. No.: 195,252

[22] Filed: Oct. 8, 1980

[30] Foreign Application Priority Data

Oct. 10, 1979 [DE] Fed. Rep. of Germany ....... 2940870

[51] Int. Cl.³ .............................................. B32B 23/08
[52] U.S. Cl. .................................... 428/511; 428/513; 428/514; 428/512; 430/512; 430/538
[58] Field of Search ................ 430/538, 512; 428/511, 428/512, 513, 514

[56] References Cited

U.S. PATENT DOCUMENTS

| | | | |
|---|---|---|---|
| 2,756,150 | 7/1956 | Griggs et al. | 430/538 |
| 3,161,519 | 12/1964 | Alsup | 430/538 |
| 3,369,901 | 2/1968 | Fogg et al. | 430/538 |
| 3,682,639 | 8/1972 | Barbehenn et al. | 430/538 |
| 3,755,069 | 8/1973 | Grawford et al. | 430/538 |
| 4,169,937 | 5/1981 | Asanuma et al. | 430/538 |

Primary Examiner—Jack P. Brammer
Attorney, Agent, or Firm—Lockwood, Dewey, Alex & Cummings

[57] ABSTRACT

A photographic paper base comprises a base paper which bears two resin layers arranged one on top of the other on at least one side. The side of the paper which is destined to receive the photographic layer is coated with two resin layers lying one on top of the other, i.e., a first layer lying on the paper and the second layer arranged to contact the photographic layer. Only the second layer contains stabilizers and/or antioxidants, these being preferably in the range 0.03 to 2.0% by weight.

6 Claims, 1 Drawing Figure

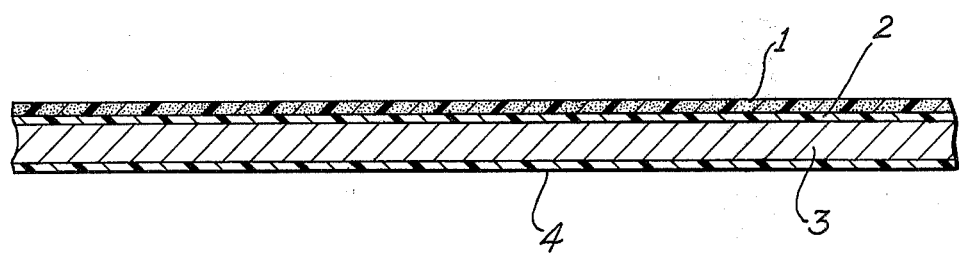

PHOTOGRAPHIC PAPER BASE WITH IMPROVED DURABILITY

BACKGROUND OF THE INVENTION

The invention relates to the manufacture of resin-treated photographic paper film bases with improved durability.

Photographic paper film bases having a high resistance to the effect of photographic processing solutions include a base paper which is treated on both sides with resin, as is known. Such resin-treated papers are preferably manufactured by extrusion treatment with the aid of a fishtail die, whereby a thermoplastic polyolefin resin, e.g. polyethylene, is applied on both sides of the web of paper. As a rule, the front resin coating contains at least a white pigment to enhance good image or picture definition. It may also contain fluorescent dyestuffs (white toners) and shading dyes in order to obtain an optical impression of increased whiteness of the coated paper and to adapt it to the requirements of the market dependent on taste.

The process is also known of preparing resin-coated base materials by an oxidizing primary treatment, e.g. by means of coronal or flame treatment, in such a way that they can subsequently be coated with photosensitive emulsion layers which adhere to the underlayer. For the front resin layers facing the photosensitive layers, high-pressure polyethylenes are preferred which have a lesser thickness and a branched molecular structure.

Although polyolefins are generally considered to be relatively stable, and branched polyethylenes in particular, just like other resins with tertiary C-atoms, they are subject to separation which appears during the extrusion process and also, above all, from the action of light on the coated material. Therefore, stabilizers and/or antioxidants are added to such polyethylenes, as are usual in the case of oxidation-sensitive resins, which offer some protection against this undesirable separation.

There are a multitude of stabilizers and antioxidants which vary chemically, which are currently usually combined to form effective mixtures in accordance with the various reaction mechanisms of the polymer breakdown. Suitable examples of such compounds are specified in the main in published German patent application No. 2,160,463.

In this published patent application, the determining disadvantage of all stabilizing and antioxidant active additives is also described. The additives are prone to efflorescence. Consequently, with the usage of stabilizers and antioxidants in the paper coating resins, the adhesion of the resin to the base paper is impaired to such an extent that, with further treatment processes, a separation of the layer may occur. Furthermore, in the case of antioxidants which contain sulphur in the molecule, e.g. thiobisphenol, decomposition products emerge which produce a haze in the overlying photographic layers.

One solution to these problems is suggested in published German patent application No. 2,160,463. That published patent application suggests that the antioxidants and stabilizers should not be incorporated into the resin layer, but instead, they should be worked into the base paper. From there they will diffuse into the resin coat to stabilize it during normal usage of the paper product.

One disadvantage of this process, however, is that the pigmented resin material is not protected during the extrusion procedure with its attendant heavy mechanical and thermal demand. A further disadvantage is the fact that the proportion of stabilizers and/or antioxidants acquired at normal temperatures through diffusion into the resin layer is very slight. In actual fact, the effect of the process described in published German patent application No. 2,160,463 is so limited that the durability of the photos, which are exposed to a constantly changing influence of light, heat and humidity in showcases, is only increased by some 10 to 60%. Example 1 of that application demonstrates an improvement in the durability of from 112 to 184 hours. Example 2 only produces an improvement of the durability from 10 days to 11 days. In the practice of photographic publicity, on the other hand, it is desirable that photographs should be able to remain in showcases for several months without damage. Embodiments of this invention, thus, seek to create resin coated paper bases for photographic films, which are not only free from the described disadvantages of impairment of adhesion of the resin coat, but are also considerably improved vis-a-vis the durability of the photographs in showcases.

SUMMARY OF THE INVENTION

According to the invention there is provided a photographic paper base comprising a base paper which bears two resin layers arranged one on top of the other on at least the side destined to receive the photographic layer. The first layer lies on the paper and the second layer lies on the first layer and is destined to receive the photographic layer in contact therewith. Only the second layer contains stabilizers and antioxidants.

Preferably, the second resin layer contains the stabilizers and antioxidants in the range of 0.03 to 2.0% by weight.

The resin layer lying on the paper preferably comprises a polymer or copolymer which is produced entirely or predominantly from ethylenic unsaturated hydrocarbons or chlorinated hydrocarbons. Examples of suitable polymers or copolymers are polyethylenes, polystyrene, polychloroprene, polyvinylidenechloride, styrene/butadiene copolymer, ethylene/vinylacetate copolymer, ethylene/acrylate copolymer, styrene/acrylate copolymer, or styrene/vinylidenechloride copolyer. This layer does not contain any additional stabilizers and antioxidants.

The second resin layer lying on top of the first and facing the photographic layer is preferably polyethylene, a mixture of various polyethylenes or mixtures of polyethylene with other hydrocarbon resins. Each of the resin layers may contain other admixtures, which promote the function of the coated materials as a base for photographic layers. Such additives are for example white pigments, color pigments for shading, antistatic compositions, lubricants, optical brighteners, UV absorbers, antihaze compositions and antihalo compositions.

A coated paper composition, in accordance with the invention, suprisingly possesses considerable superiority to conventionally furnished papers.

Such a result was not foreseeable because no reason is known why the bad adhesion which is conditional on the efflorescence of the stabilizers or antioxidants of the upper layer does not occur in the present invention. It is possible to attempt to explain this advantageous effect or rather the good stabilization effect of the procedure in accordance with the invention by a deposit action or deposit effect, in which the effloresced stabilizing means is impounded between the resin layers in a manner of speaking. On the other hand, the bonding between the two resin layers is expected to be impaired thereby and result in bad adhesion. However, this is suprisingly not so. The adhesion is not impaired and, at the same time, the durability of the photographic material produced with this resin coated paper is clearly improved vis-a-vis the comparison samples, although a smaller quantity of stabilizers and/or antioxidants is used.

The application of the two resin layers onto the paper can be carried out in accordance with well known procedures, either one after the other, or simultaneously. In the case of successive application, various application techniques may be used for the first layer adjacent to the paper without stabilizers. Resins, which are in the form of a dispersion, are applied, for example, by means of blade or roller coating procedure. Firm resins are applied, for example, with a well-known smelting coating process. But, it is also possible to apply the first layer in the form of a fluid preparation which can be hardened by radiation and then solidify it by the effect of radiation.

On the other hand, the second layer, which contains stabilizers and/or antioxidants and consists of polyolefin resin, is always applied by the smelting extrusion process with the aid of a wide air jet.

In the case of simultaneous application, the coextrusion process is used.

BRIEF DESCRIPTION OF THE DRAWING

The prepared composition of the paper in accordance with the invention is portrayed in the single drawing attached.

In this drawing, the upper resin layer 1 takes the photographic layer or emulsion. The lower resin layer 2 lies on the paper 3 and the resin layer 4 covers the other surface of paper 3. The antioxidant and/or the stabilizer is contained in the upper layer 1.

EXAMPLES OF PREFERRED EMBODIMENTS

Preferred embodiments of the invention are set forth in the following examples:

EXAMPLE 1

A photographic base paper with a weight of 170 g/m$^2$, which is sized internally with alkylketenedimer, is coated with the aid of a blade coating device with a hydrous dispersion of a styrene/butadiene copolymer of 70 weight % styrene and 30 weight % butadiene, dried and finished. The surface weight of this first polymer coating amounts to approximately 12 g/m$^2$. A mixture of 90% high-pressure polyethylene with 9.0% titanic oxide of the anatas type and 0.9% 4.4' butylidene-bis (6 tert-butyl-m-cresol) and 0.1% tris(nonylphenyl) phosphite is applied onto this initial layer as a stabilizer mixture at an extrusion temperature of 310° C. as the second resin layer. The polyethylene used has a smelting index of 4 (g/10 min). Approximately 25 g/m$^2$ of the mixture is applied.

EXAMPLE 2

A photographic base paper with a weight of 160 g/m$^2$ is coated with the aid of a blade coating device with a mixture of 70% polyvinylidene-chloride, 29.5% sodium cellulose sulphate and 0.5% of an optical brightener of the stilbene type, dried and finished. The application weight is approximately 8 g/m$^2$. After coronal treatment of the surface, a stabilized and pigmented polyethylene layer is applied onto this surface as a second resin layer, in confirmity with example 1. The strength of this layer is approximately 25 g/m$^2$.

EXAMPLE 3

A photographic base paper with a weight of 160 g/m$^2$ is coated after coronal treatment of the surface by means of extrusion coating at 330° C. with approximately 15 g/m$^2$ of an initial resin layer which consists of high-pressure polyethylenes with a smelting index of 8. This layer is covered at 310° C. with a second, but pigmented, polyethylene layer, which consists of a mixture of 60% low-pressure polyethylene (thickness 0.960, smelting index 12), 30% high-pressure polyethylene (thickness 0.917, smelting index 7) with 10% titanic oxide (rutile type). The pigmented polyethylene mixture contains in addition:

0.1% optical brightener (2.5-di (5 tert.-butylbenzoxazolyl-2')-thiophene, 0.3% cobalt blue (coaluminate), 0.3% cadmium red (cadmium sulphide-selenide, color index: pigmentort 108 No. 77196), 0.2% pentaerythrityl-tetrakis-3-(3.5-di-tert.buty-4-hydroxyphenyl)-propionate, 0.2% tetrakis-(2.4-di-tert.butylphenyl)-4.4'-biphenylylendi-phosphonite, and 0.2% calcium stearate applied onto the pigment-/polyethylene mixture. Approximately 20 g/m$^2$ of the total mixture is applied.

EXAMPLE 4

A photographic base paper with a weight of approximately 180 g/m$^2$ is coated by means of extrusion coating with wide air jet at 300° C. with approximately 8 g/m$^2$ of intial resin layer, which consists of ionomer resin, which is identified with a smelting index of 2.8. The ionomer resin is a copolymer consisting of 90% ethylene and 10% acrylate, which is 50% neutralized with sodium ions. A pigmented polyethylene with optical brightener, shading dyestuffs and stabilizer additives is extruded onto this intial resin layer in conformity with example 3. The strength of this second layer is approximately 25 g/m$^2$.

EXAMPLE 5

A photographic base paper with a weight of approximately 150 g/m$^2$ is coated with two resins by the coextrusion process. The layer facing the paper consists of ethylene/vinylacetate copolymer, which is identified with the monomer ratio 81/19 and a smelting index of 24. The resin is extruded at a temperature of 240° C. to a layer strength of 13 g/m$^2$.

The second outer-lying resin layer, which is to be coated subsequently with a photographic emulsion, is extruded at 310° C., and consists of:

60% low-pressure polyethylene (thickness 0.96, smelting index 12),

25% high-pressure polyethylene (thickness 0.917, smelting index 7),

7% titanic oxide (rutile type), and

8% nonhygroscopic calcium carbonate and is applied onto the pigmented base mixture and mixed with the following further additives:

0.1% 2.5-di-(5-tert.butylbenzoxazolyl-2') thiophen as optical brightener,
0.1% N,N'-dibenzal oxalic acid dihydracid,
0.4% pentaerythrityl-tetrakis-(3-(3.5-di-tert-butyl-4-hydroxyphenyl)-propionate),
0.1% sebacin acid-bis 2.2.6.6-tetra-methyl-4-piperidylester,
0.2% calcium stearate, and
0.2% ultra-marine (reddish).

The strength of the second pigmented and stabilized resin layer is approximately 20 g/m².

EXAMPLE 6

A photographic base paper with a weight of approximately 180 g/m² is coated as in example 4 by means of a wide air jet with approximately 10 g/m² of an initial resin layer consisting of ionomer resin, which differs from example 4 in that it contains 0.2% of an optical brightener of the thiophen type. Over this initial resin layer, another pigmented polyethylene layer is extruded also by means of wide air jet and has the following composition:

50% low-pressure polyethylene (thickness 0.96, smelting index 12),
34% high-pressure polyethylene (thickness 0.917, smelting index 7),
10% titanic oxide (anatas type),
0.8% cobalt/lithium phosphate,
0.2% copper-phthalocyaninblue color pigment,
0.3% UV absorber 2-(2-hydroxy-3.5-di-tert.amylphenyl)-2H-benztriazol,
0.2% antioxidant octadecyl-3-3(3.5-di-tert.butyl-4hydroxyphenyl)-propionate,
0.4% Ni-complex of the 3.5-ditert.butyl-4-hydroxybenzyl-monoethyl-phosphonate, and
0.1% calcium stearate.

The mixture is applied at an extrusion temperature of 300° C. in a quantity of approximately 25 g/m².

EXAMPLE 7

A photographic base paper with a weight of approximately 170 g/m² is coated by means of a blade with approximately 10 g/m² of a mixture which can be polymerized. The composition of the mixture is:

45 weight % bexanedioldiacrylate,
45 weight % polyesteracrylate, and
10 weight % titanic oxide (anatas).

The layer is hardened by electronic beam (150 keV electronic energy and 100 mA beam current) under nitrous protective gas.

The initial resin layer thus produced is coated by the extrusion coating process by means of a wide air jet at 310° C. with approximately 25 g/m² of a stabilized pigmented polyethylene layer. The composition of the polyethylene layer is:

78% high-pressure polyethylene (thickness 0.924, smelting index 4),
4% titanic oxide (rutile type),
8% titanic oxide (anatas type),
0.3% calcium oxide,
0.2% tetrakos-(2.4-di-tert.butylphenyl)-4.4'-biphenylene disphosphonite,
0.1% tetrakis-(methylene-3-(3',5'-di-tert.-butyl-4'-hydroxphenyl)-propionate)-methane,
0.1% optical brightener 2.5-di(5-tert-butylbenzoxazolyl-2') thiophen,
0.2% ultra-marine (reddish), and
0.1% stearic acid.

EXAMPLE 8

A photographic base paper with a weight of approximately 130 g/m² is coated by means of a blade with approximately 7 g/m² of a mixture which can be polymerized. The composition of the mixture is:

40% styrene,
7% bexanedioldiacrylate,
8% acrylic acid-esterified bisphenol A-epoxy resin,
25% polyvinylbutyral,
12% polysterene resin (M=350),
5% calcium carbonate, and
3% polypropylene (pulverised).

The layer is hardened as in example 7 with electronic beams and coated with a stabilized, pigmented polyethylene layer with an approximate weight of 18 g/m². The extrusion temperature is 320° C. and the composition of the polyethylene layer complies with the formulation given in example 7.

EXAMPLE 9

A photographic base paper with a weight of approximately 100 g/m² is coated with the aid of a blade coating device in the paper machine with a coating solution with the following composition:

40% approximately 45% dispersion of a styrene-/butadiene/acrylic acid copolymer (monomer ratio 60:38:2),
30%-45% dispersion of a polypropylene,
20% titanic oxide (anatas type), and
10% of a 30% ammoniacal solution of styrene/malein acid copolymer (monomer ratio 50:50).

After drying, a coating application of approximately 10 g/m² emerges.

A stabilized, pigmented polyethylene layer is applied over this initial resin layer by means of extrusion coating at 310° C. The strength of this second layer is approximately 15 g/m². The composition of the polyethylene is:

89.3% high-pressure polyethylene (thickness 0.917, smelting index 5),
10% titanic oxide (rutile type),
0.3% phthalocyanine blue color pigment,
0.1% optical brightener of the thiophen type,
0.2% 2,2' thiodiethylbis-(3-(3.5-di-tert.butyl-4-hydroxyphenyl)propionate), and
0.1% calcium-bis-(0-ethyl-3.5-di-tert.butyl-4hydroxybenzyl-phosphonate).

EXAMPLES OF COMPARISON

Comparison A

In conformity with German patent application No. 2,160,463, Example 1, a photographic base paper with a weight of 170 g/m² is prepared and coated with the stabilizing solution specified therein, which contains 1 weight % respectively of octadecal-(3.5-di-tert.butyl-4-hydroxyphenulacetate and tris-(3.5-di-tert.butyl-4-hydroxyphenylphosphate).

This paper saturated with antioxidants and stabilizers is then coated by means of extrusion coating at 320° C. with approximately 36 g/m² of a polyethylene mixture, which consists of:

89.5% polyethylene of average thickness (thickness 0.935, smelting index 8),
10% titanic oxide (rutile type),
0.4% ultra-marine, and
0.1% stearylstearamid

Comparison B

A photographic base paper with a weight of approximately 170 g/m², as used in example 1, is coated by means of extrusion coating at 320° C. with approximately 36 g/m² of a stabilized and pigmented polyethylene mixture with the same composition as in example 1.

Comparison C

A photographic base paper with a weight of approximately 170 g/m² is coated as in the comparison example A by means of extrusion coating at approximately 320° C. with approximately 36 g/m² of a pigmented polyethylene mixture. The polyethylene mixture has the same composition as in comparison example A. The base paper, however, does not contain any stabilizers, but complies with the base paper of example 1.

Comparison D

A photographic base paper with a weight of approximately 170 g/m² is coated as in comparison example B at approximately 320° C. with approximately 36 g/m² of a pigmented polyethylene mixture. The polyethylene mixture complies with the composition of example 1, but does not contain the stabilizing mixture used there.

All papers coated with polyethylene on one side of examples 1 to 9 and of comparisons A to D were given a high gloss surface with the extrusion coating, in order to create comparable conditions. In other test series, similar papers with matte finished and other polyethylene surfaces were produced and inspected in the same way as the papers of examples 1 to 9 and comparisons A to D. The results of the tests showed the same tendency, which is described in more detail hereinafter, independent of the particular structure of the surface. Thereby, the papers with a more glossy surface are representative of any surface structures. The papers of examples 1 to 7 and of comparisons A to D are coated, before any further processing, uniformly on the side opposite the first coating with approximately 32 g/m² and the paper of example 8 with approximately 23 g/m² of a mixture of:

80 weight % low-pressure polyethylene (thickness 0.96, smelting index 10), and 20 weight % high-pressure polyethylene (thickness 0.92, smelting index 4).

Then the first coated, pigmented polyethylene side is subjected to a coronal treatment, in a well known way, and coated with a photographic emulsion which is usually stipulated for black and white processing based on gelatin and halides of silver.

All papers are exposed to light and developed to the maximum density in a known manner (so-called black sheet).

The paper of example 9 is coated on the noncoated reverse side with approximately 19 g/m² of a mixture of:

75 weight % low-pressure polyethylene (thickness 0.96, smelting index 10), and 25 weight % high-pressure polyethylene (thickness 0.92, smelting index 4).

This paper then undergoes a coronal treatment in a known way on the pigmented, initially coated side and is subsequently coated with an acid layer of gelatin and silver nuclei, as is used for silver salt diffusion procedures. The positive paper thus produced is moistened with a usual trade transmission agent in a known development device for the purpose of producing a "black sheet", pressed together with unexposed negative paper moistened in the same manner ("Copyrapid" process), taken from the device and separated from the negative paper after approximately 30 seconds.

The "black sheets" thus obtained of examples 1 to 9 and comparisons A to D are subjected to an aging operation in an apparatus set up for that purpose, in order to obtain comparative statements regarding the showcase durability of the papers.

The test arrangement for the execution of the aging operation consists of a box (70×55×7 cm) with a light-transmitting plastic plate, in which the "black specimens" are exposed alternately in a 2-hour rhythm to a dry-warm climate with UV exposure and a damp-cold climate in darkness. The technical data of the test arrangement are:

| | |
|---|---|
| Light-transmitting plate | Polymethylmethacrylate |
| Lamps | 4 × 300 W (Osram Ultra-Vitalux) |
| Distance lamp-pattern | 40 cm |
| Humidity of the air: | 20 to 80% r.F. |
| Temperature: | 60 to 20° C. |
| Time rhythm: | 2 hours dry, warm, bright |
| | 2 hours damp, cold, dark |
| | (automatic synchronous switching) |
| Air moistening: | 4 washing bottles with water |
| Air drying: | 4 washing bottles with silica gel |
| Forced air circulation. | |

The black specimens (4.5×7 cm) are clamped on two sides, respectively, while left in the aging operation box, until a commencing crack formation becomes evident in the black layer. The test results on the examples in accordance with the examples and the comparison examples are classified in the following table. This table also includes the polyethylene adhesion in the case of the individual tests. "Good" in the adhesion column means that the polyethylene layer cannot be removed from the base paper without disturbance. "Bad" means easy removal without paper fibers remaining on the polyethylene film.

Results of the tests

| Example No. | Adhesion | Commencement of the crack formation on the surface (Days) |
|---|---|---|
| 1 | good | 58 |
| 2 | good | 53 |
| 3 | good | 65 |
| 4 | good | 62 |
| 5 | good | 66 |
| 6 | good | 55 |
| 7 | good | 59 |
| 8 | good | 61 |
| 9 | good | 60 |
| Comparison A | good | 38 |
| Comparison B | bad | 37* |
| Comparison C | good | 35 |
| Comparison D | good | 29 |

*Inaccurate value on account of layer separation

It will be understood that the embodiments of the present invention which have been described are merely illustrative of a few applications of the principles of the invention. Numerous modifications may be made by those skilled in the art without departing from the true spirit and scope of the invention.

What is claimed is:

1. A photographic paper base comprising a base paper and first and second resin layers arranged one on top of the other on at least one side of said said base paper, said first resin layer lying on the paper and said second resin layer lying on the first layer and having a surface which is adapted to contact and receive a photographic layer, wherein said second layer includes a polyolefin and only said second layer at the time of application to said first layer contains at least one of stabilizer and antioxidant compositions for stabilization of said resins against degradation from oxidation or light.

2. A paper base as claimed in claim 1, wherein said second resin layer contains said composition in the range of 0.03 to 2.0% by weight.

3. A paper base as claimed in claim 1, wherein said first resin layer is formed by a polymer or copolymer which is from the group consisting of ethylenic unsaturated hydrocarbons and chlorinated hydrocarbons.

4. A paper base as claimed in claim 3, wherein the polymer or copolymer is selected from the group consisting of polyethylene, polystyrene, polychloroprene, polyvinylidenechloride, styrene/butadiene copolymers, ethylene/vinylacetate copolymers, ethylene/acrylate copolymers, styrene/acrylate copolymers, and styrene/vinylidenechloride copolymers.

5. A paper base as claimed in claim 1, wherein said second resin layer is selected from the group consisting of polyethylene, a mixture of various polyethylenes and mixtures of polyethylene and other hydrocarbons.

6. A paper base as claimed in claim 1, wherein each of said resin layers contains further additives, selected from the group consisting of white pigments, color pigments for shading, antistatic compositions, lubricants, optical brighteners, UV absorbers, anti-haze compositions and antihalo compositions.

* * * * *